United States Patent [19]

Alford

[11] 4,325,609

[45] Apr. 20, 1982

[54] VEHICLE SAFETY MIRROR

[76] Inventor: Steven D. Alford, 426 Birch Rd., Wyoming, Minn. 55092

[21] Appl. No.: 128,110

[22] Filed: Mar. 7, 1980

[51] Int. Cl.³ .......................... G02B 5/10; B60R 1/08
[52] U.S. Cl. .................................. 350/293; 350/174; 350/303; 350/304
[58] Field of Search ............... 350/174, 288, 291, 293, 350/303, 304, 307, 61

[56] References Cited

U.S. PATENT DOCUMENTS

| | | |
|---|---|---|
| 1,199,882 | 10/1916 | Frey . |
| 1,401,942 | 12/1921 | Benzer et al. . |
| 1,493,609 | 5/1924 | Dailey .................... 350/288 |
| 1,768,354 | 6/1930 | Falge . |
| 2,106,889 | 2/1938 | Frank . |
| 2,387,745 | 10/1945 | Colbert et al. ............ 350/288 |
| 2,437,154 | 3/1948 | Dohanian . |
| 2,534,135 | 12/1950 | Lahr et al. . |
| 2,796,805 | 6/1957 | Morgan .................... 350/174 |
| 3,131,250 | 4/1964 | Ely . |
| 3,170,985 | 2/1965 | Katulich ................... 350/293 |
| 3,280,701 | 10/1966 | Donnelly et al. ....... 350/288 X |
| 3,375,053 | 3/1968 | Ward ...................... 350/304 X |
| 3,408,136 | 10/1968 | Travis ...................... 350/293 |
| 3,446,916 | 5/1969 | Abel et al. . |
| 3,450,465 | 6/1969 | Prance et al. . |
| 3,510,206 | 5/1970 | Smith ........................ 350/292 |
| 3,799,650 | 3/1974 | Saxe ........................ 350/291 |
| 4,040,726 | 8/1977 | Paca ........................ 350/288 |
| 4,076,373 | 2/1978 | Moretti ....................... 350/61 |
| 4,156,557 | 5/1979 | Skewis ...................... 350/307 |

FOREIGN PATENT DOCUMENTS

1349296  4/1974  United Kingdom ............... 350/307

*Primary Examiner*—F. L. Evans
*Attorney, Agent, or Firm*—Kinney, Lange, Braddock, Westman and Fairbairn

[57] ABSTRACT

A two-way mirror device for vehicles, and particularly for use as a side view mirror on heavy duty and medium duty commercial transport vehicles. The device includes a frame for holding mirrors, including a mounting means for mounting the frame on a vehicle. A semi-transparent plane mirror is mounted in the frame and positioned to permit viewing through the mirror and reverse reflected off of the mirror. A semi-transparent convex mirror is mounted in the frame and positioned to permit viewing through the mirror and an enlarged field of view reverse reflected off of the convex mirror. Finally, transparent backing means are attached to the frame for holding the plane mirror and the convex mirror such that forward viewing through the mirrors is also through the backing means. In a preferred embodiment, the vertical axis of the convex mirror is independently adjustable with respect to the plane mirror axis. The backing means may be removable for replacement or may comprise a plurality of layers of transparent material adapted to be removed one at a time.

15 Claims, 6 Drawing Figures

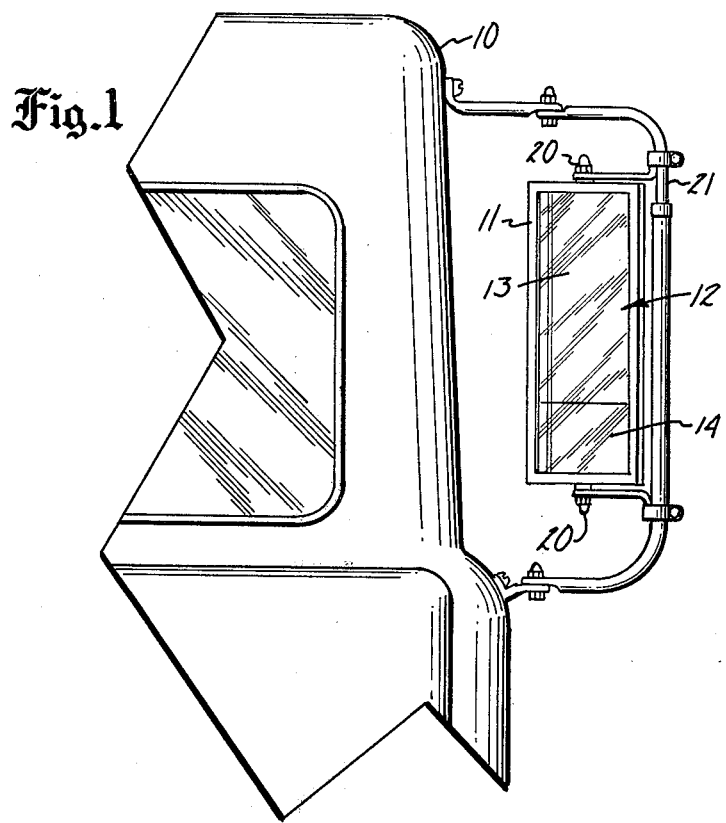
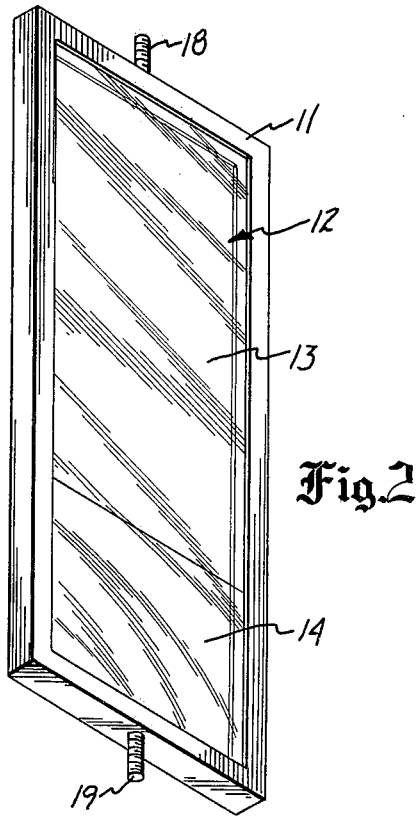
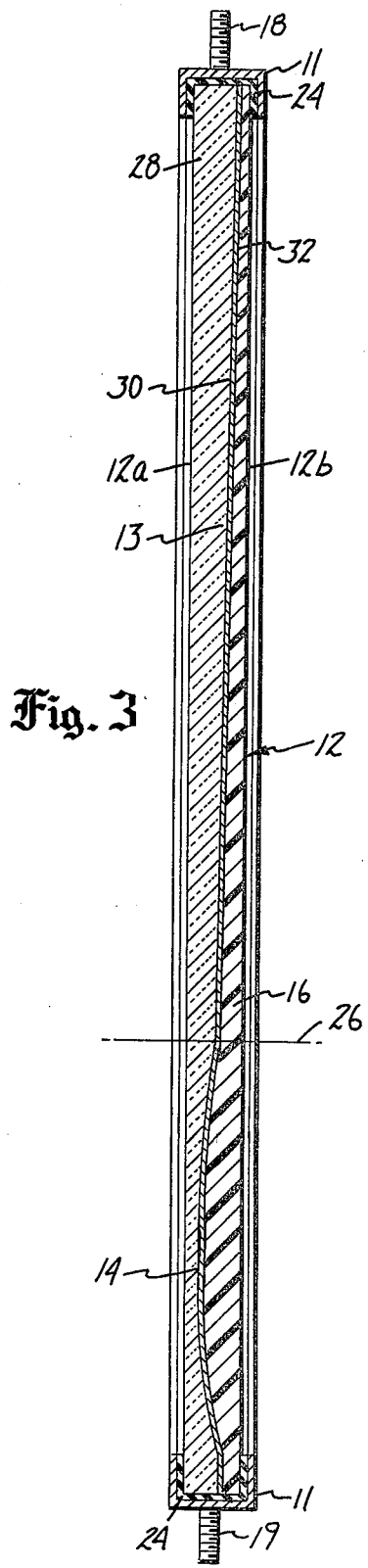

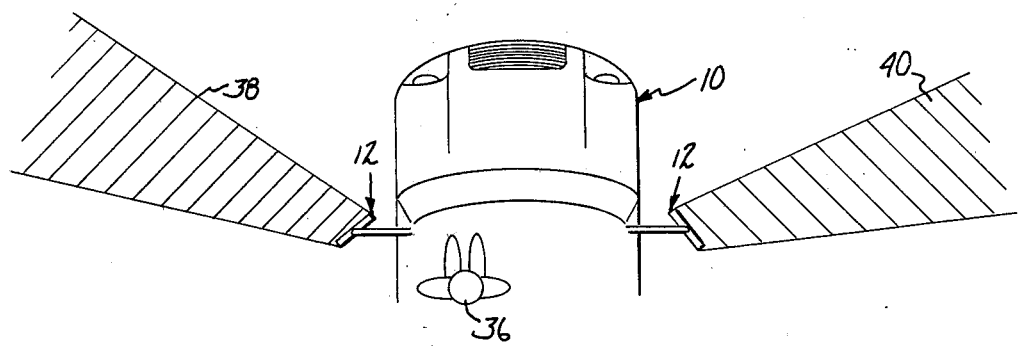
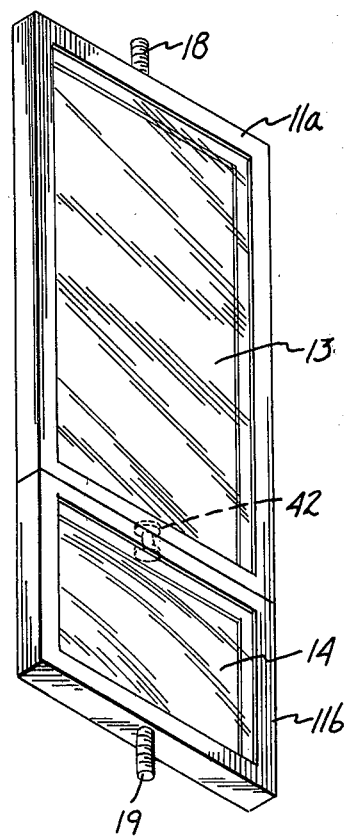
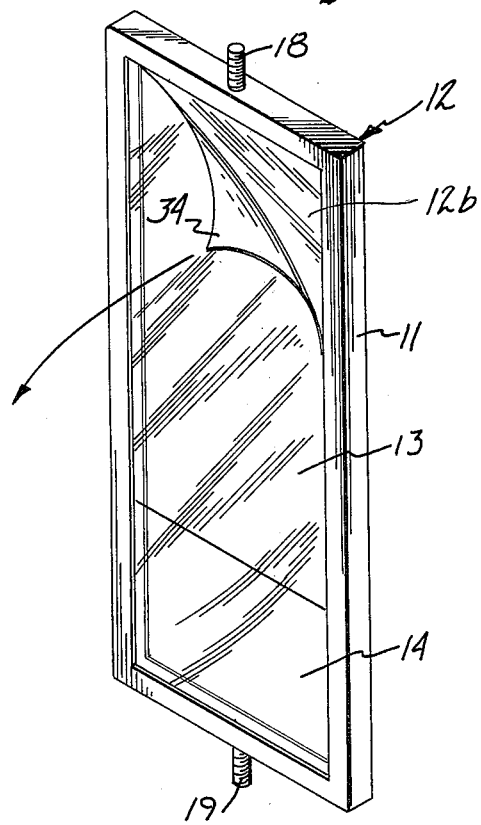

VEHICLE SAFETY MIRROR

BACKGROUND OF THE INVENTION

1. Field of the Invention

While there is a present trend to more efficient operation of motor vehicles, there is also an ongoing concern for the safety in vehicle operations. Reduced speed limits, for example, are enforced both to save energy and to save lives.

Various devices have been proposed to further the goals of both energy and safety, for large hauling transports and personal cars. Along with major changes such as governors for truck engines and catalytic converters for emission control have been relatively inexpensive improvements which have contributed to increased economy and safety.

As motor vehicles have been improved, driver error has contributed a larger percentage of unsafe conditions because very little can be, or is being done to improve driver attentiveness. Nevertheless, an improvement in a vehicle which would permit the operator to increase his field of view will permit the anticipation of dangerous or unsafe conditions, so that the operator can take necessary precautionary steps. One particularly important area of concern is the present-day side and/or rearview mirrors being used, particularly on large vehicles such as tractor-trailers. In many instances, a mirror large enough to give an adequate field of view to the rear blocks out an unsafe portion of the forward viewing area. Mirrors positioned out of the forward viewing area or of a small enough size to be relatively unrestrictive of the forward viewing area are not adequate for presenting a large field of view in the appropriate rearward direction.

While many attempts have been made to modify the common rearview mirror, most improvements have related to the placement of the mirror in an optimum place to minimize obstruction of the forward view. In the converse, several devices have been provided which function as an intentional blocking of the forward view to reduce headlight glare from oncoming automobiles while providing a rearview mirror. Examples of these devices are U.S. Pat. 2,106,889 and U.S. Pat. No. 1,493,609. The latter patent teaches a combined rearview mirror and glare shield which employs a mirror which reflects from the back and transmits from the front to permit reduction of glare.

Other proposals which have been made employ the use of a plurality of mirrors which are inefficient and which cause the operator to look in a direction substantially away from the direction in which the vehicle is traveling. None of the present-day rear and sideview mirror systems permit relatively safe forward viewing with an accompanying safe relatively large field of view to the rear while utilizing low-cost, lightweight and inexpensive parts.

SUMMARY OF THE INVENTION

It has now been discovered that an improved mirror may be provided for use with motorized vehicles. The improved mirror comprises a frame for holding mirrors, including a mounting means for mounting the frame on a vehicle. A semi-transparent plane mirror is mounted in the frame and positioned to permit forward viewing through the mirror and simultaneous reverse reflected viewing off of the mirror. Also provided is a semi-transparent convex mirror mounted in the frame and positioned again to permit forward viewing forward through the mirror and an enlarged field of view reflected off the convex mirror to the reverse direction of travel. A transparent backing means is attached to the frame for holding the plane mirror and the convex mirror such that forward viewing through the mirror is also through the backing means. In a preferred embodiment, the mounting means is sized to fit conventional sideview mounting mirror brackets for use on large trucks. In another embodiment, the plane semi-transparent mirror is wedge shaped and positioned with the wide portion of the wedge upward, such that glare from incident light which is reflected off the plane mirror is substantially reduced. Normally, the convex mirror is positioned below the plane mirror to permit a wider field of view closer to the ground.

In one embodiment, the vertical axis of the convex mirror is independently adjustable with respect to the vertical axis of the plane mirror, so that an extremely wide field of view can be surveyed. Of course, adjustment of the vertical axis of either or both of these mirrors does not in any way impare the forward viewing since both mirrors permit forward viewing without any significant obstruction of vision. While the backing means is transparent and permits viewing through both mirrors in a forward direction, in a preferred embodiment of this invention the damage caused by typical road usage over long periods of time, such as chipping and pitting by stones, dust and the like can be avoided. The backing means may be removably attached to both of said mirrors and said frame or, in the alternative, can be comprised of a plurality of layers of transparent plastic adapted to be removed one at a time.

BRIEF DESCRIPTION OF THE DRAWINGS

FIG. 1 is a cut-away elevational view showing the invention mounted on a motor vehicle.

FIG. 2 is a perspective view of a preferred embodiment of the present invention.

FIG. 3 is a cross-sectional view of the device as shown in FIG. 2.

FIG. 4 is a diagram illustrating the elimination of blind spots with the present invention.

FIG. 5 is a perspective view of still another embodiment of the present invention.

FIG. 6 is a perspective view of still another embodiment of the present invention.

DETAILED DESCRIPTION OF THE PREFERRED EMBODIMENTS

Referring now to the drawings wherein like reference characters designate like or corresponding parts through the several views, there is shown in FIGS. 1–3 a preferred embodiment of the principles of the present invention.

In FIG. 1, attached to vehicle 10 is frame 11 which holds improved mirror 12 of the present invention. As best shown in FIGS. 2 and 3, mirror 12 includes a plane semi-transparent mirror 13 and a semi-transparent convex mirror 14, and transparent backing means 16 (FIG. 3). With mirror 12 of the present invention, both forward and reverse viewing is provided, thereby eliminating blind spots. Forward viewing through mirrors 13 and 14 is provided by transmission of light through backing means 16 and mirrors 13 and 14. Reverse viewing is provided by reflection of light off both the plane mirror 13 and in an enlarged form off the convex mirror 14. Mounting means 18 and 19 are provided for mounting frame 11 on vehicle 10.

As shown in FIG. 1, mounting means (e.g. bolts) 18 and 19 may be attached to a bracket 21 of conventional design through nuts 20 which fit on bolts 18 and 19. By properly sizing the frame 11 and mounting means 18 and 19, the device of the present invention is adapted to fit conventional sideview mirror mounting brackets 21 as shown in FIG. 1.

As shown in the sectional view of FIG. 3, frame 11 holds plane mirror 13, convex mirror 14 and backing means 16 in position. In the embodiment shown in FIG. 3, the improved mirror 12 of the present invention is a unitary structure formed of plane mirror 13, convex mirror 14, and backing means 16. Mirror 12 has a substantially planar surface 12a which faces the driver, and a substantially planar surface 12b which faces oncoming traffic. Mirror 12 is held in position by frame 11. In the preferred embodiment shown in FIG. 3, cushion material 24 is interposed between frame 11 and the edges of mirror 12 to absorb shock due to road vibrations and the like.

A composite mirror 12 of the present invention includes a semi-transparent plane mirror 13 formed in the upper portion of mirror 12 above imaginary line 26 and a convex mirror portion 14 located in the portion of mirror 12 below imaginary line 26. Mirrors 13 and 14 include glass plate 28, which is preferably safety glass. Plate 28 has one surface which corresponds to front surface 12a of the composite mirror 12. The opposite surface 30 of glass plate 28 has a semi-transparent and semi-reflecting metal coating 32 which provides the transmission and reflection characteristics of the composite mirror. As shown in FIG. 3, surface 30 of glass plate 28 is not parallel to surface 12a. Instead, in the upper portion above imaginary line 26, surface 30 is at an angle with respect to surface 12a, so that plate 28 is wedge shaped, with the thicker portion of the wedge at the upper end of plate 28.

In the portion of plate 28 below imaginary line 26, surface 30 is concave. With the reflective/transmissive coating 32 on surface 30, the upper portion 13a acts as an inclined partially reflecting, partially transmitting plane mirror.

In the portion below imaginary line 26, the concave contour of surface 30 with the partially reflecting/transmitting coating 32 acts as a convex mirror to provide a wide field of view for reflective viewing.

In the embodiment shown in FIG. 3, backing means 16 preferably conforms to surface 30, and provides surface 12b which is generally parallel to surface 12a of the composite mirror. As a result, backing means 16 is of a generally wedge shape complimenting the wedge shape of glass plate 28 above imaginary line 26, and has a convex shape which conforms to the contour of surface 30 in that portion below imaginary line 26. Backing means 16 preferebly is a high impact resistant clear plastic material, such as high density polyethylene, certain clear cast epoxies and the like.

Backing means 16 protects the transparency coating 32 against stones, sand, rain and all of the environment. Because transparent coating 32 is sandwiched between glass plate 28 and backing means 16, environmental factors which tend to degrade transparent coating 32 with time are not permitted to reach coating 32. This increases the usable life of composite mirror 12.

The preferred embodiment of the present invention shown in FIG. 3 also reduces glare problems from headlights of oncoming cars. Since surface 30 and coating 32 are inclined with respect to surface 12a, a portion of the light received from oncoming traffic is reflected by coating 32 forward and downward away from the driver of the vehicle. Similarly, the portion of the coating below imaginary line 26 acts as a concave mirror in reflecting a portion of the oncoming light forward. To further reduce glare, backing means 16 may be tinted, while still providing transparent properties.

FIG. 4 illustrates the substantial advantages of the mirror of the present invention. In the diagram shown in FIG. 4, driver 36 is shown positioned in vehicle 10. With mirrors 12 of the present invention, driver 36 can view objects within areas 38 and 40, due to the semi-transparent nature of mirrors 12. Areas 38 and 40 represent blind spots with conventional mirrors. The present invention, therefore, substantially eliminates blind spots and thereby reduces safety hazards.

FIG. 5 shows another embodiment of the present invention in which semi-transparent mirrors 13 and 14 are mounted in separate frame positions 11a and 11b. Frame portions 11a and 11b are pivotally mounted with respect to one another by swivel 42. This permits individual adjustment of the position of mirrors 13 and 14.

FIG. 6 is a perspective view of another embodiment in which a high impact resistant transparent sheet 34 is mounted on surface 12b in contact with backing means 16. In this optional embodiment, one or more sheets 34 may be provided to protect surface 12b against the environment. As the outer surface of removable sheet 34 becomes worn due to the environment, sheet 34 is peeled off or removed (as illustrated in FIG. 6), thereby extending the life of mirror 12.

Although the invention has been described in considerable detail in the foregoing for the purpose of illustration, it is to be understood that variations can be made by those skilled in the art without departing from the spirit of the invention and the scope of the claims.

What is claimed is:

1. A two-way exterior mirror device for a motor vehicle comprising;
    a substantially open frame for holding mirrors, including mounting means for mounting said frame on the exterior of the vehicle;
    a semi-transparent plane mirror mounted in said frame and positioned to permit viewing through said mirror and reverse reflected off said mirror;
    a semi-transparent convex mirror mounted in said frame and positioned to permit viewing through said mirror and an enlarged field of view reverse reflected off said convex mirror; and
    transparent backing means attached to said frame for holding said plane mirror and said convex mirror such that viewing through said mirror is through said backing means, said backing means being made of a high impact resistant transparent plastic material.

2. The device of claim 1 wherein said mounting means is sized to fit conventional sideview mirror mounting brackets.

3. The device of claim 1 wherein said plane semitransparent mirror is wedge shaped and positioned with the wide portion of the wedge upward, whereby glare from incident light reflected off said plane mirror is reduced.

4. The device of claim 1 wherein said convex mirror is positioned below said plane mirror.

5. The device of claim 1 wherein the vertical axis of said convex mirror is independently adjustable with respect to the vertical axis of said plane mirror.

6. The device of claim 1 and further including a plurality of layers of high impact transparent plastic adapted to be removed one at a time mounted in contact with said backing means.

7. The device of claim 1 wherein said backing means is removably attached to both said plane mirror and said convex mirror.

8. A two-way mirror device for vehicles, comprising:
   a substantially open frame for holding mirrors, including mounting means for mounting said frame on a vehicle;
   a semi-transparent plane mirror mounted in said frame and positioned to permit viewing through said mirror and reverse reflected off said mirror;
   a semi-transparent convex mirror mounted in said frame and positioned to permit viewing through said mirror and an enlarged field of view reverse reflected off said convex mirror; and
   transparent backing means attached to said frame for holding said plane mirror and said convex mirror such that viewing through said mirror is through said backing means, and wherein the semi-transparent plane mirror, the semi-transparent convex mirror, and the transparent backing means comprise a unitary structure having first and second planar outer surfaces.

9. The device of claim 8 wherein the unitary structure comprises a first transparent plate having an outer surface which forms the first outer surface of the unitary structure and an inner surface having a generally planar portion and a generally concave portion; and a semi-transparent metal coating on the inner surface of the first transparent plate.

10. The device of claim 9 wherein the transparent backing means comprises a second transparent plate of a high impact resistant transparent material having an outer surface forming the second outer surface of the unitary structure, and an inner surface which conforms to the inner surface of the first transparent plate.

11. The device of claim 10 wherein the first and second transparent plates and the frame substantially encapsulate the semi-transparent metal coating to prevent the semi-transparent metal coating from being exposed to the environment.

12. The device of claim 11 wherein the planar portion of the inner surface of the first transparent plate is inclined with respect to the first outer surface.

13. A two-way exterior side mirror device for use in combination with a motor vehicle, the device comprising:
   a mounting bracket for attachment to an exterior surface of the motor vehicle;
   a substantially open frame;
   pivotal mounting means for pivotally mounting the frame to the mounting bracket for pivotal movement about a substantially vertical axis; and
   a semi-transparent mirror mounted within said frame and having a front substantially transparent plate, a back substantially transparent plate and semi-transparent reflective means between the front and back plates, the front and back transparent plates attached to each other such that viewing is permitted through said mirror along with reflection off said mirror, wherein the back plate is made of a transparent impact resistant material.

14. The device of claim 13 wherein the transparent impact resistant material is a substantially clear plastic.

15. In combination:
   a motor vehicle having a driver's compartment within which a driver sits when operating the motor vehicle;
   a mounting bracket mounted to the exterior of the motor vehicle generally forward of and to one side of the driver's compartment and attached to the exterior of the motor vehicle;
   a substantially open mounting frame;
   pivotal mounting means for pivotally mounting the frame on the mounting bracket to permit pivotal movement of the frame with respect to the mounting bracket about a generally vertical pivot axis; and
   a two-way exterior side mirror mounted in the open mounting frame, the mirror having a front substantially transparent plate, a back substantially transparent plate, and semi-transparent reflective means between the front and back plates, the front and back plates being mounted adjacent one another in the frame such that the two-way mirror permits the driver to view simultaneously an area to the rear of the motor vehicle by reflection and an area forward of the mirror by transmission through the front and back plates and the semi-transparent reflective means.

* * * * *